(12) United States Patent
Mahlab

(10) Patent No.: US 7,127,178 B2
(45) Date of Patent: Oct. 24, 2006

(54) OPTICAL COMMUNICATION DEVICE

(75) Inventor: Uri Mahlab, Or Yehuda (IL)

(73) Assignee: ECI Telecom Ltd., Petach Tikva (IL)

( * ) Notice: Subject to any disclaimer, the term of this patent is extended or adjusted under 35 U.S.C. 154(b) by 633 days.

(21) Appl. No.: 10/312,724

(22) PCT Filed: Jun. 28, 2001

(86) PCT No.: PCT/IL01/00594

§ 371 (c)(1),
(2), (4) Date: Dec. 30, 2002

(87) PCT Pub. No.: WO02/01764

PCT Pub. Date: Jan. 3, 2002

(65) Prior Publication Data

US 2004/0008922 A1 Jan. 15, 2004

(30) Foreign Application Priority Data

Jun. 29, 2000 (IL) .................................. 137083

(51) Int. Cl.
*H04B 10/12* (2006.01)

(52) U.S. Cl. .................... 398/141; 398/79; 398/147; 398/148; 398/158; 398/159; 398/66; 398/67; 398/68; 398/70; 398/71; 398/72; 398/82; 398/140; 385/123; 385/124; 385/1; 385/126; 385/127

(58) Field of Classification Search ................ 359/124; 398/140–142, 79, 159, 158, 66, 67, 68, 70, 398/21, 72, 82, 147, 148; 385/123, 124, 385/1, 126, 127

See application file for complete search history.

(56) References Cited

U.S. PATENT DOCUMENTS

| 4,979,234 A | 12/1990 | Agrawal et al. |
| 5,371,625 A | 12/1994 | Wedding et al. |
| 5,847,863 A | 12/1998 | Galvanauskas et al. |
| 2002/0163688 A1* | 11/2002 | Zhu et al. .................... 359/124 |

OTHER PUBLICATIONS

Azana et al., "Technique for Multiplying the Repetition Rates of Periodic Trains of Pulses by Means of a Temporal Self-Imaging Effect in Chirped Fiber Gratings", *Optics Letters*, vol. 24, No. 23, pp. 1672-1674 (Dec. 1, 1999).

(Continued)

*Primary Examiner*—Hanh Phan
(74) *Attorney, Agent, or Firm*—Browdy and Neimark, PLLC

(57) ABSTRACT

An optical extending device for use in transmission of optical signals which comprise at least one sequence of periodic optical signals, said optical device comprising: a first fiber optic having a characteristic dimensional propagation coefficient equal to $\beta_1$ and adapted to be connected to a single mode second fiber optic having a length equal to $L_0$ and a characteristic dimensional propagation coefficient equal to $\beta_0$, wherein $L_p$, the length of said first fiber optic is substantially equal to $\{[T^2/\Pi-L_0*\beta_0]/\beta_1\}*\{1-MOD(L_0/\{T^2/\Pi-L_0*\beta_0\}/g(b))\}$ and wherein: n is an integer 1, 2, 3 . . . and is selected in accordance $L_0$, the length of the single mode second fiber optic; T is a time period of the periodic optical signals; and MOD is the remainder obtained from dividing $l_0$ by $\{[T^2/\Pi-L_0*\beta_0]/\beta_1\}$.

18 Claims, 3 Drawing Sheets

OTHER PUBLICATIONS

Indebetouw, "Quasi-Self-Imaging using Aperiodic Sequences", *J. Opt. Soc. Am. A*, vol. 9, No. 4 pp. 549-558 (Apr. 1992).

Jannson et al., "Temporal Self-Imaging Effect in Single-Mode Fibers", *J. Opt. Soc. Am.*, vol. 71, No. 11, pp. 1373-1376 (Nov. 1981).

Maeda et al., "Transmission Experiment Over 4,000 km in an Optical WDM Network Using Wavelength Multiplexers and Demultiplexers", pp. 113-117 from *Core Networks and Network Management*, edited by D.W. Faulkner and A.L. Harmer, IOS Press, 1999.

* cited by examiner

OPTICAL COMMUNICATION DEVICE

FIELD OF THE INVENTION

The present invention relates to a system and method for optical transmission of communication and in particularly, to optical telecommunication systems in which periodic optical signals are transmitted.

BACKGROUND OF THE INVENTION

One of the problems known in the art to be associated with transmission of optical signals via optical network, is a problem known as dispersion. Typically, the optical output at the transmitting end is modulated and transmitted in its modulated form. However, in the optical network the beam undergoes light dispersion, which causes a distortion of the transmitted signal.

Various solutions were suggested in the past to overcome the dispersion problem. They included electronic methods used at the receiver and/or transmitter, and the use of high-dispersion optical elements located along the fiber link. U.S. Pat. No. 5,371,625 is one such publication that tries to address the dispersion problem. The publication discloses a frequency modulation technique used instead of the intensity modulation to increase the path of the transmission. However, this requires a suitable optical receiver at the receiving end.

U.S. Pat. No. 4,979,234 teaches the use of a saturated semiconductor laser amplifier that can impose a chirp upon optical pulses having a pulse repetition rate in the range of 8 to 16 GHz, and having an optical carrier wave of wavelength in the near infra-red range. This solution ensures that degradation of the pulses because of dispersion does not commence until after an initial portion of the fiber segment has been traversed by the propagating pulses.

As known in the art, a temporal self-imaging effect in single mode fibers (also known as TALBOT effect) can be applied to reflection of periodic signals, from linearly chirped fiber gratings. This effect can be used for multiplying the repetition frequency of a given periodic pulse train without distorting the individual pulse characteristics. For a given fiber, the practical limit on the frequency multiplication factor depends only on the temporal width of the individual pulse.

Furthermore, a combination of techniques for short pulse mode generation such as pulse mode locking and the self-imaging effects allows to obtain short pulse trains with ultrahigh repetition rates, in the terabit regime as described for example in "Temporal self-Imaging in single mode fibers", T. Jannson and J. Jannson, JOSA-A Vol. 71, No. 11, 1393–1376, November (1981); "Technique for multiplying the repetition rates of periodic trains of pulses by means of a temporal—self imaging effect in chirped fiber gratings", J. Azanz and M. A. Muriel, Opt. Lett. Vol, 24, No. 23, 16721674, (1999); "Quasi Self Imaging using apreiodic sequences", G. Indebetouw, JOSA-A Vol. 9, No. 4, 549–558, November (1992). The disclosures of all references mentioned above and throughout the present specification are hereby incorporated herein by reference.

SUMMARY OF THE INVENTION

It is an object of the present invention to provide an optical system having an increased quality of signals transmitted therethrough.

It is yet another object of the present invention to provide a device that is operative to restore periodic optical signals transmitted in optical telecommunication networks.

It is still another object of the present invention to provide method for improving quality of periodic signals transmitted in optical systems.

Other objects of the invention will become apparent as the description of the invention proceeds.

According to a first aspect of the invention there is provided an optical extending device for use in transmitting optical signals which comprise at least one sequence of periodic optical signals, said optical device comprising:

a first fiber optic having a characteristic dimensional propagation coefficient equal to $\beta_1$ and adapted to be connected to a single mode second fiber optic having a length equal to $L_0$ and a characteristic dimensional propagation coefficient equal to $\beta_0$, wherein $L_P$, the length of said first fiber optic is substantially equal to $$\{[T^2/\pi - L_0 * \beta_0]/\beta_1\} * \{1 - MOD(L_0/\{[T^2/\pi - L_0 * \beta_0]/\beta_1\}\}$$

and the overall length of the first and second fiber optics is $n \cdot L_P$ and wherein:

n is an integer 1, 2, 3 . . . and is selected in accordance $L_0$, the length of said single mode second fiber optic;

T is a time period of the periodic optical signals; and

MOD is the remainder obtained from dividing $L_0$ by $\{[T^2/\pi - L_0 * \beta_0]/\beta_1\}$.

According to a preferred embodiment of the invention there is provided an optical apparatus that comprises an optical connector adapted to connect a single mode optical fiber having a length equal to $L_0$ and a characteristic dimensional propagation coefficient equal to $\beta_0$, with at least one optical extending device of the type described above and an optical signal egress means. When the extension fiber has the same physical characteristics as the single mode optical fiber, $\beta_0$ in the above formula is equal to $\beta_1$.

According to a preferred embodiment of the invention, the signals delivered via the device described herein are at a bit rate of at least 10 GHz.

According to another preferred embodiment of the invention, a transmission comprises periodic type signals and non-periodic signals. The periodic type signals may be signals used for synchronization purposes. Alternatively, such signals may be used as addresses/headers in packet-based networks such as IP networks, where preferably, the device of the invention is installed at routing nodes, allowing the retrieval of optical information used in the identification of routing addresses at much better reliability, e.g. by reducing routing errors. The non-periodic type signals are typically data signals and the like.

According to yet another embodiment of the present invention, the apparatus described comprises a plurality of optical fiber extensions. Each of these extensions has an appropriate length in accordance with the overall length of the link it is associated with and the parameters identifying the transmissions delivered therethrough. As an example, some of the plurality of optical fiber extensions may be adapted to convey telecommunication signals at different bit rates.

According to another aspect of the invention, there is provided a telecommunication system comprising:

at least one optical transmitter;

an optical link adapted to convey communication signals transmitted by said transmitter;

a self signal constructor adapted to convey said telecommunication signals transmitted along said optical link and forward them, comprising at least one optical extending device as described above; and at least one optical receiver.

A self signal constructor according to the present invention should be understood to encompass any means that can reconstruct the signals, e.g. their image, their sequence, their pattern and the like, as explained herein.

According to an embodiment of the invention, there is provided a system comprising a plurality of optical transmitters each of which is linked to a wavelength multiplexer which is operative to receive outputs from said optical transmitters over a plurality of optical channels, a single mode optical fiber and an optical extending device associated therewith connecting the wavelength multiplexer with a wavelength demultiplexer which is operative to receive an input from said wavelength multiplexer, to de-multiplex the input received and transfer the plurality of de-multiplexed inputs to a plurality of optical receivers.

According to a further aspect of the invention there is provided a telecommunication router adapted to receive optical communication information from at least one transmitting device, where the router comprises at least one optical extending device of the type specified. Typically, the optical communication information comprises an address information and a payload information, where the address information comprises at least one sequence of periodic optical signals. According to this embodiment the addresses of the transmissions that are received by the router and should be forwarded is received at a high quality, and the number of cases where errors in destination occur due to the distortion of the address signals, are reduced.

By yet another aspect of the invention there is provided a network through which at least part of the optical information is transmitted in the form of periodic optical signals and the network comprises a plurality of the devices provided by the present invention. Typically, such a network may be considered as a combination of segments each of which defined between two neighboring elements. In each of such elements the optical information may either be converted into electrical information, or be further transmitted along a transmission path. Also, the information in its electrical form may be further processed, converted into optical information and forwarded along such a transmission path. In accordance with the present invention, each of these network elements may further comprise at least one optical fiber extension element of the type specified. The length of each of the at least one optical fiber extension element is calculated based on the length and properties of the optical link connecting this element to its preceding element and the rate by which the information is transmitted there.

As will be appreciated by a person skilled in the art, such a network may typically comprise optical devices they may affect the calculation of the length required for the fiber optic extension. Examples of such devices are in-line amplifiers, dispersion compensation fibers, etc. In order to take into account the presence of these devices along the transmission link, each such optical device is defined with an equivalent length and that equivalent length is added to the overall link length.

According to still another aspect of the present invention there is provided a telecommunication apparatus comprising:

a plurality of first optical transceivers operative to convey optical transmissions;

a second optical transceiver being in communication with said plurality of first optical transceivers, and connected to each of said plurality of first optical transceivers via a fiber optic having a length that is equal to a product of n and $\{[T^2/\pi - L_0 * \beta_0]/\beta_1\}$. When an optical transmission is received at the second optical transceiver it may be detected and converted to its corresponding electrical form. Alternatively, the optical transmission received may be detected and wavelength converted.

According to a preferred embodiment of this aspect of the invention, the telecommunication apparatus further comprises a multiplexing/demultiplexing device adapted to operate in communication with any of said plurality of first optical transceivers.

BRIEF DESCRIPTION OF THE DRAWINGS

The present invention will be understood and appreciated more fully from the following detailed description, taken in conjunction with the drawings in which.

DETAILED DESCRIPTION OF THE INVENTION

Figure 1:
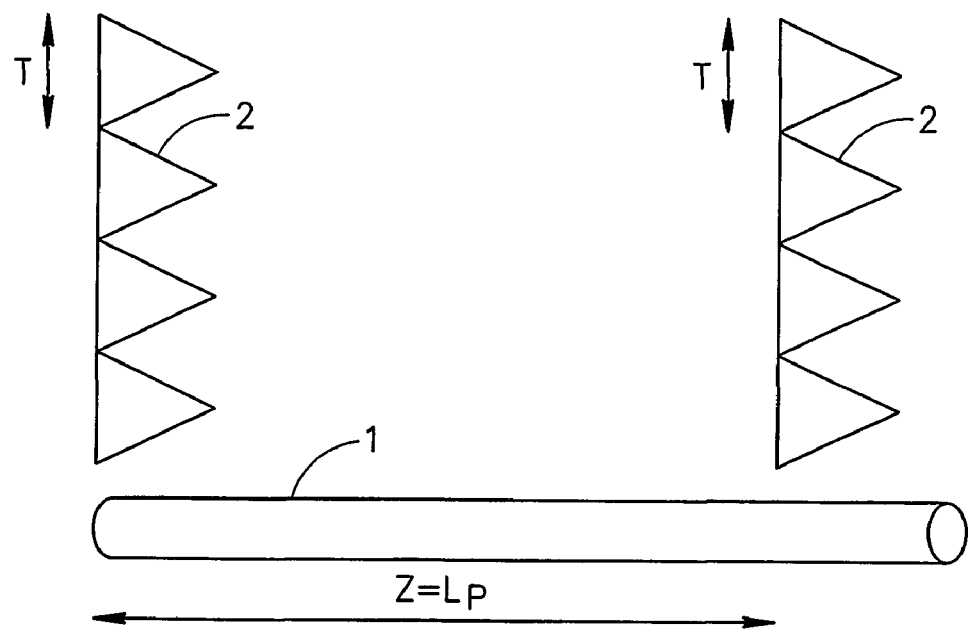
FIG. 1 illustrates a typical self-imaging effect of a communication signal in a single mode optical fiber.

FIG. 1 presents a schematic illustration of a self imaging effect in a single mode fiber 1. According to the example presented, the pattern of an input periodic signal 2 is replicated every a distance measured from the information source, is equal to a product of an integer by $L_P$, where $L_P$ being equal to $T^2/(\pi*\beta)$.

Thus, when a detector is located at a distance that is equal to $n*L_P$ from the information source (n being an integer having the value of 1, 2, 3 . . . ), periodic signals will be detected by this detector in their self-reconstructed pattern, substantially free of distortion caused by the dispersion effect.

Figure 2:
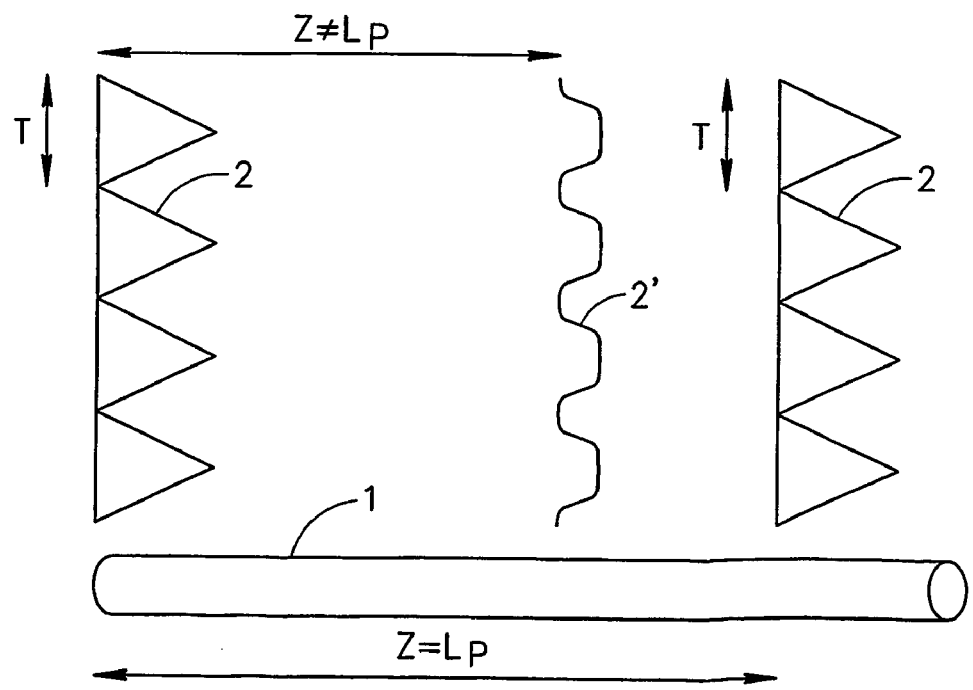
FIG. 2 is an example of distorted pattern of a signal not satisfying the requirements for self-imaging.

The mechanism described above is further illustrated in FIG. 2. A non-distorted signals' pattern 2 is detectable every time a detector/receiver is located at a distance that is equal to $n*L_P$. However, when this distance is not equal to such a product, a distorted periodic pulse pattern 2', would be detected.

Reference is now made to FIG. 3, which illustrates schematically a preferred embodiment of an optical self signal constructing unit built and operative in accordance with a preferred embodiment of the present invention.

Therefore, in accordance with the present invention, in order to reconstruct a periodic signal and obtain good operability for features such as time recovery, code detection, etc. the path along which that signal is transmitted, is extended by an additional optical fiber so that the overall extended path to become a product of $n*L_P$. However, in the case that the extension portion is made of a different fiber (having a different $\beta$), the self signal reconstruction of the signals will occur every time the distance as measured from the signals' optical origin, is equal to a product of $L_P$ by an integer, where:

$$L_P=[T^2/\pi-L_0*\beta_0]/\beta_1.$$

According to yet another embodiment of the invention, $L_P$, the length of the extending portion is chosen arbitrarily but when in operation, it is subjected to a voltage that causes a change in the characteristic dimensional propagation coefficient of the extending portion ($\beta$) so that the following equation is satisfied:

$$\beta_1=[T^2/\pi-L_0*\beta_0]/L_P$$

As would be appreciated by a man skilled in the art, such an extension device may be applied in various optical communication systems, where periodic pulse sequence of signals are transferred. Examples of such applications can be found where periodic signals are used for synchronization purposes, as addresses for routing packets, for classification purposes, for monitoring purposes and the like.

Figure 3A:
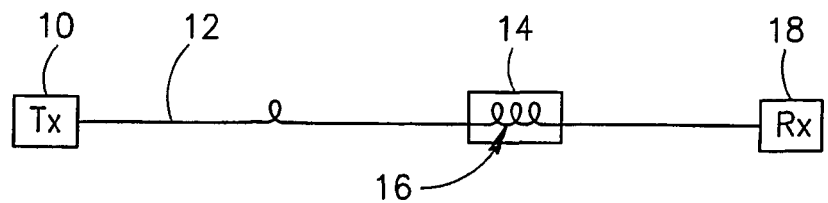
FIG. 3 demonstrates an embodiment of the present invention of a transponder module having self-imaging capabilities.

The example schematically illustrated in FIG. 3a, includes a transmitter 10 connected to an optical fiber 12 having a length L. Optical fiber 12 is connected at its other end to a self signal constructor 14 which comprises an additional optical fiber 16 of a length L'. This set up allows the transmission of signals from transmitter 10 via an extended optical fiber (12 and 16) to transceiver 18, where the signal is received at its non-distorted pattern. Therefrom, the signal thus received may be further transmitted with or without converting the original wavelength used.

Figure 3B:
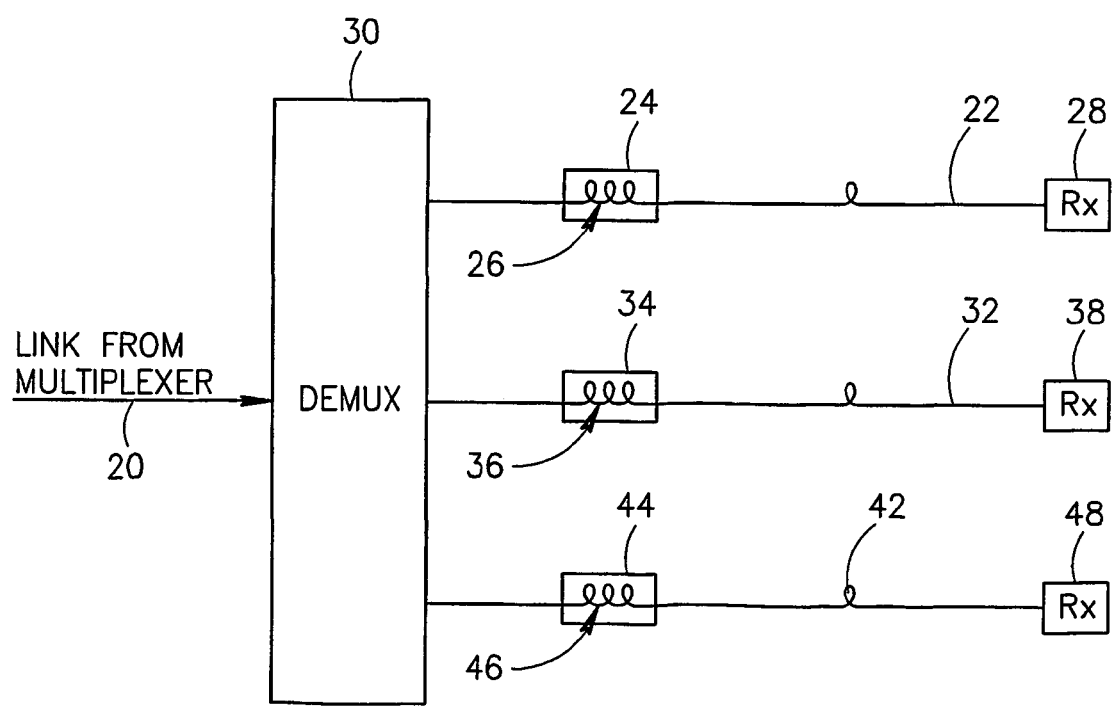

As can be appreciated by a person skilled in the art, this configuration can be extended for use in a case of multiple transmitters, as presented in FIG. 3b. In this latter case, a multiplexed transmission is transmitted along link 20 and is demultiplexed in demultiplexer 30. Each of the demultiplexed transmissions is forwarded along its corresponding transmission path. In the case illustrated, the transmission is demultiplexed into three transmissions that are to be forwarded along links 22, 32, 42. Each one of these links further comprises a self signal constructor (24, 34, 44 respectively) provided with extension optic fibers (26, 36, 46 respectively), where the length of each of the extension fibers is selected so that the length of optical fiber to which it is connected (22, 32, 42, respectively) is extended as explained above. These self signal constructors may either be used as separate entities or alternatively, be a part of a module.

The length of the extension fibers 26, 36 and 46 is such that allows the self imaging of periodic pulse sequence in each of the respective transceiver units 28, 38 and 48.

Let us now consider a case where a periodic sequence of signals is transmitted at a bit rate of 40 GHz, via an optical fiber 80 Km long and having the characteristic dimensional propagation coefficient, $\beta$, equal to 0.1 psec$^2$/m. In such a case, the sequence will be reproduced every 1,989 meters. The length of the fiber extension will therefore be equal to:

1989*[1−MOD(80000/1989)]=1989*0.779=1549 m long.

Figure 4:
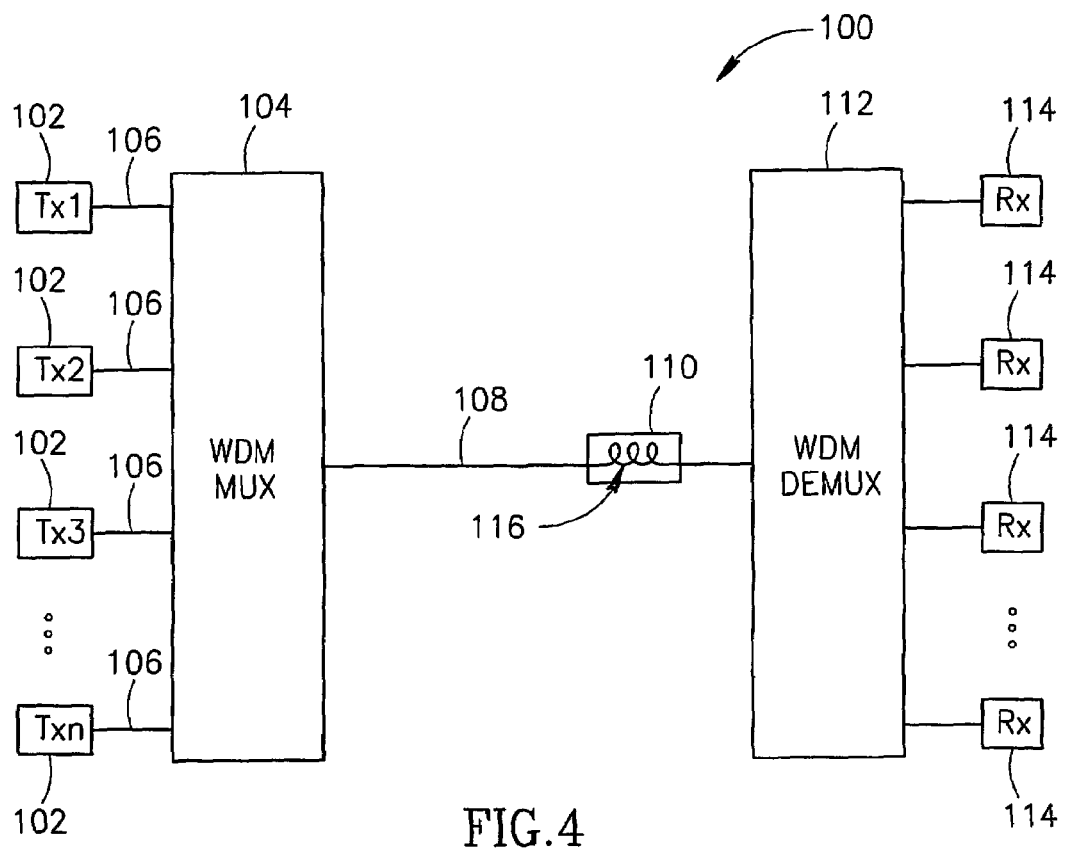
FIG. 4 presents a different embodiment of the present invention of a device having self-imaging capabilities.

Reference is now made to FIG. 4, which is a simplified block diagram of a system constructed and operative in accordance with a preferred embodiment of the present invention. System 100 comprises a plurality of optical transmitters 102, each of which is linked to a WDM multiplexer 104. Each of the transmitters is adapted to transmit a set of periodic signals, and each of these sets has a time period T that is either equal to one or more time periods of sets transmitted from other transmitters, or an integer product thereof. WDM multiplexer 104 receives the outputs of these optical transmitters over a plurality of optical channels 106. The length of each of optical channels 106 is substantially equal to the length of the other 106 channels, measured between their corresponding transmitter and the WDM multiplexer. A link comprising optical fiber 108 and a self signal constructor 110 connects multiplexer 104 with a WDM demultiplexer 112 that is adapted to de-multiplex the input received and transfer the plurality of de-multiplexed transmissions. The de-multiplexed inputs are received by a plurality of optical receivers 114, each receiving input from WDM demultiplexer 112. Self signal constructor 110 comprises an optical fiber 116 that is $L_{110}$ m long, where $L_{110}$ is chosen to bring the total length between the transmitter and the receiver to a product of $L_P$ by n (an integer).

Figure 5:
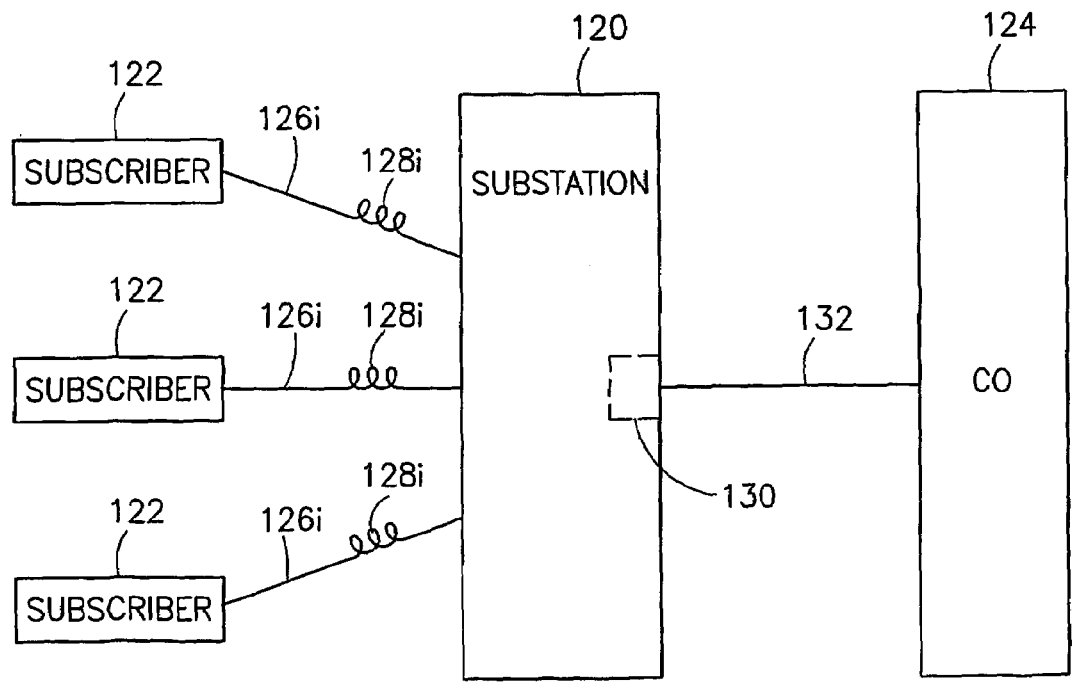
FIG. 5 presents yet another embodiment of the present invention of a device used in a substation.

FIG. 5 illustrates substation 120 located near subscribers 122 and is in communication with Central Office (CO) 124. According to this embodiment, at least some of subscribers 122 are in communication with substation 120 via optical fibers 126i. If required, extension fibers 128i are connected to optical fibers 126i as described above, and allow improved restoration of the periodic signals at the receiving end of fibers 126i. Typically, the transmission via each of optical fibers 126i is carried at a wavelength different than that of the other optical fibers.

The length of each of extension fibers 128i may be determined by any one of a number of methods. One such method may be described as follows: a transmitting light source, e.g. LED is connected at one end of optical fiber 126i and is used to transmit periodic signals at a constant and pre-determined power P(0). The power of signal $P(L_{0i})$ received at the other end of a $L_{0i}$ Km long optical fiber 126i is measured, and the values of these two parameters are substituted in the following formula:

$$L_{0i}=(10/(\alpha)\log[P(0)/P(L_{0i})]$$

where $\alpha$ is the attenuation coefficient of the optical fiber i and has the dimensions of [dB/Km].

Once $L_{0i}$ is determined, the length of its corresponding extension fiber, $L_{ei}$, is evaluated for the expected transmission rate in accordance with $$L_{ei}=\{[T^2/\pi-L_0*\beta_0]/\beta_1\}*\{1-MOD(L_0/\{[T^2/\pi-L_0*\beta_0]/\beta_1\}\}$$

as described above.

An optical fiber 128i having the length of $L_{ei}$ is then connected to optical fiber 126i by any method for connecting two optical fibers as known in the art per se. According to another embodiment of the invention, substation 120 further comprises a multiplexer/demultiplexer 130. Incorporating such a multiplexing/demultiplexing device in the substation, may be used for example to multiplex signals received from subscribers 122, as well as signals received from subscribers using other technologies e.g. digital pair gain devices, digital loop carriers, remote switching units and the like, if applicable. In such a case, the optical signals received in substation 120 are converted into their corresponding electrical form and all the signals received are multiplexed for transmission over a single communication medium 132. Communication medium 132 may be a fiber optic, standard POTS telephone line, xDSL, wireless or any other medium as appropriate for use with devices 130 as is known in the art. Inverse multiplexing (demultiplexing) is used in the opposite direction to split the transmission received along communication medium 132 into a number of transmissions, each directed to a subscriber connected to substation 120.

It will be appreciated that the above-described methods may be varied in many ways, including but not limited to, changing the exact implementation used. It should also be appreciated that the above described description of methods and networks are to be interpreted as including network in which the methods are carried out and methods of using the network components.

The present invention has been described using non-limiting detailed descriptions of preferred embodiments thereof that are provided by way of example and are not intended to limit the scope of the invention. It should be understood that features described with respect to one embodiment may be used with other embodiments and that not all embodiments of the invention have all the features shown in a particular figure. Variations of embodiments described will occur to persons of the art. Furthermore, the terms "comprise", "include", "have" and their conjugates, shall mean, when used in the claims "including but not necessarily limited to".

The invention claimed is:

1. An optical extending device for use in transmission of optical signals which comprise at least one sequence of periodic optical signals, said optical device comprising:
a first fiber optic having a characteristic dimensional propagation coefficient equal to $\beta_1$ and adapted to be connected to a single mode second fiber optic having a length equal to $L_0$ and a characteristic dimensional propagation coefficient equal to $\beta_0$ wherein $L_P$, the length of said first fiber optic is substantially equal to $$\{[T^2/\pi-L_0*\beta_0]/\beta_1\}*\{1-MOD(L_0/\{[T^2/\pi-L_0*\beta_0]/\beta_1\}\}$$

and the overall length of said first and second fiber optics is $n \cdot L_P$
and wherein:
n is an integer 1, 2, 3. . . , and is selected in accordance $L_0$, the length of said single mode second fiber optic;
T is a time period of the periodic optical signals; and
MOD is the remainder obtained from dividing $L_0$ by $\{[T^2/\pi-L_0*\beta_0]/\beta_1\}$.

2. An optical communication device comprising:
an optical connector adapted to connect a single mode optical fiber having a length equal to $L_0$ and a characteristic dimensional propagation coefficient equal to $\beta_0$, with at least one optical fiber extension;
at least one optical extending device of claim 1; and
an optical signal egress means.

3. An optical communication device according to claim 2, comprising a plurality of optical extending devices.

4. An optical communication device according to claim 3, wherein at least some of said plurality of optical fiber extensions are adapted to convey telecommunication signals at different wavelengths.

5. A system according to claim 4, wherein said periodic signals are used in routing addresses.

6. A system according to claim 4, wherein said periodic signals are used for classification.

7. A system according to claim 4, wherein said periodic signals are used for monitoring.

8. An optical extending device according to claim 1, wherein $\beta_0=\beta_1$.

9. An optical extending device according to claim 1, wherein the characteristic dimensional propagation coefficient of said optical extending device is fixed to be equal to $[T^2/\pi-L_0*\beta_0]/L_P$, by subjecting said optical extending device to operate under appropriate voltage.

10. An optical extending device according to claim 1, wherein said periodic optical signals are transmitted at a bit rate of at least 10 GHz.

11. A telecommunication router comprising least one optical extending device of claim 1 and adapted to receive optical communication information that is comprised of an address information and a payload information,
wherein the address information comprises at least one sequence of periodic optical signals,
and wherein, said telecommunication router is adapted to forward said payload information in accordance with the address information.

12. A telecommunication network comprising a plurality of network elements each adapted to receive optical communication information and convert it into a corresponding electrical form, said network elements being optically connected to their neighboring elements, wherein at least one of said network elements is provided with at least one optical extending device of claim 1, and wherein $L_0$ is the equivalent length of an optical link extending between the at least one of said network elements provided with the at least one optical extending device and the corresponding neighboring network elements thereof.

13. A telecommunication system comprising:
at least one optical transmitter;
an optical link adapted to convey periodic communication signals transmitted by said transmitter;
a self signal constructor adapted to convey said periodic telecommunication signals transmitted along said optical link and forward them, comprising at least one fiber optic extension having a characteristic dimensional propagation coefficient that is equal to $\beta_1$ and having a length that is substantially equal to $$\{[T^2/\pi-L_0*\beta_0]/\beta_1\}*\{1-MOD(L_0/\{[T^2/\pi-L_0*\beta_0]/\beta_1\}\}$$

and the overall length of said optical link and said at least one fiber optic extension is $n \cdot L_P$
wherein:
$L_0$ is the length of said optical link;
$\beta_0$ is a characteristic dimensional propagation coefficient of a single mode optical fiber of said optical link;
n is an integer 1, 2, 3. . . , selected in accordance with the value of $L_0$;
T is a time period of said periodic communication signals; and
at least one optical receiver.

14. A system according to claim 13, wherein said periodic signals are used for synchronization.

15. A telecommunication system comprising:
a plurality of first optical transceivers for conveying optical transmissions, each of said first optical transceivers having an index i;
at least one second optical transceiver; and
a plurality of optical fibers for coupling said first optical transceivers to said at least one second optical transceiver for placing said at least one second optical transceiver in communication with said plurality of first optical transceivers,
wherein:
each of said plurality of optical fibers comprises a first fiber optic portion and a second fiber optic portion,
said first fiber optic portion has a characteristic dimensional propagation coefficient equal to $\beta_{1i}$,
said second fiber optic portion has a length equal to $L_{0i}$ and a characteristic dimensional propagation coefficient equal to $\beta_{0i}$, and each of said plurality of optical fibers has an overall length that is substantially equal to:

$$n \cdot \{[T_i^2/\pi - L_{0i} * \beta_{0i}]/\beta_{1i}\} * \{1 - MOD(L_{0i}/\{[T_i^2/\pi - L_{0i} * \beta_{0i} * \beta_{1i}]\})\}$$

where:
- n is an integer 1, 2, 3... and is selected in accordance with the length $L_{0i}$ associated with the respective optical fiber,
- $T_i$ is a time period of the period optical signal in the respective optical fiber, and
- MOD is the remainder obtained from dividing $L_{0i}$ by $\{[T_i^2/\pi - L_{0i} * \beta_{0i}]/\beta_{1i}\}$.

16. A telecommunication apparatus according to claim 15, wherein an optical transmission received at said second optical transceiver is detected and converted to its corresponding electrical form.

17. A telecommunication apparatus according to claim 15, wherein the optical transmission received at said second optical transceiver is detected and is wavelength converted.

18. A telecommunication apparatus according to claim 15, wherein said telecommunication apparatus further comprises a multiplexing/demultiplexing device operative in communication with any of said plurality of first optical transceivers.

* * * * *